July 20, 1948. G. J. BENTON ET AL 2,445,596

SKIN MASSAGER

Filed April 22, 1946

Inventors:
Gela Jane Benton
William A. Schumacher
By Stone Artman & Bisson
Attys.

Patented July 20, 1948

2,445,596

UNITED STATES PATENT OFFICE 2,445,596

SKIN MASSAGER

Gela Jane Benton and William A. Schumacher, Chicago, Ill.

Application April 22, 1946, Serial No. 664,076

6 Claims. (Cl. 128—24.1)

This invention relates to an improvement in a skin massager of the type employing an electric heating element and having a firm, non-absorptive, skin contacting surface. This type of massager relies upon heat to open the pores and stimulate circulation of the blood in the skin surface capillaries, and upon a polished, comparatively flat surface for more uniformly working a given skin area than is possible with the fingers.

The first object of this invention is to provide an improved work or heat-applying surface which permits a rocking action or circulating motion of the massager, in conjunction with a cream-carrying groove positioned so as to be transverse to a rocking movement, whereby the user may spread or collect cold cream as she works the skin surface. This permits deep penetration of cream into the pores, thus allowing deeper cleaning of the skin.

Another object of the invention is to hold the temperature of the heat-applying surface within a range of 130 to 135 degrees. In this range, the cold cream becomes flowable and the pores open to a maximum extent short of impairing the skin. Applicant disposes a thermostat in heat responsive relationship to the work surface for making and breaking an electric circuit connected to a heating coil.

Another object of the invention is to provide a simple structure which will provide rapid yet accurate and secure assembling. The heating and thermostatic elements are mounted in an inverted receptacle over which fits a slightly larger and equally deep receptacle carrying the work surface.

One embodiment of the invention is shown in the drawings, comprising one sheet, wherein Figure 1 is a plan view of the massager;

Figure 1:
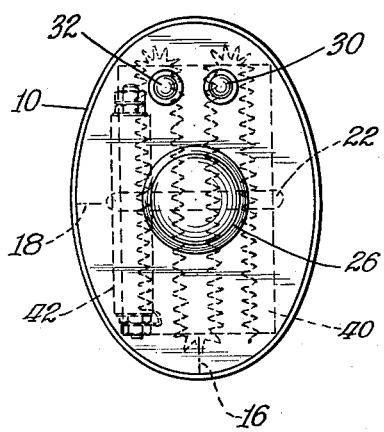
Figure 2:
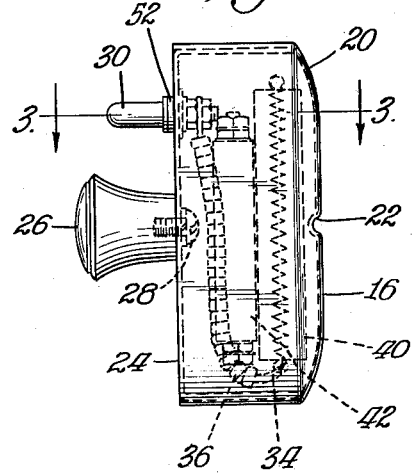
Fig. 2 is a side view.
Figure 3:
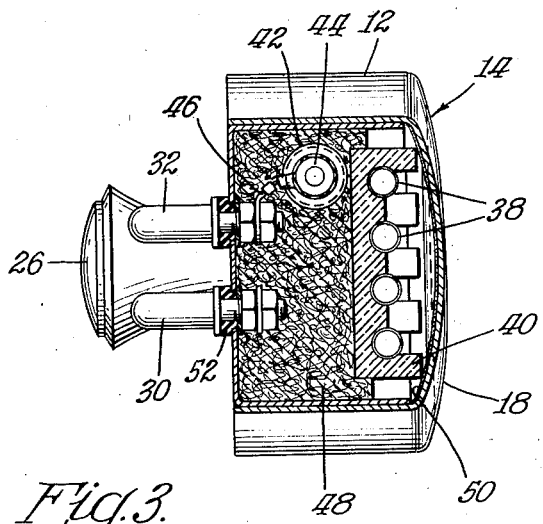
Fig. 3 is a view taken on the line 3—3 of Figure 2.

Continuing to refer to the drawings, the numeral 10 identifies a brass casing having an elliptical or oval plan with a side wall 12 and a work or heating-applying surface generally indicated by the numeral 14. This work surface has a major axis 16 and a minor axis 18, see Figure 1. Along the major axis 16, the work surface 14 is substantially straight, see Figure 2, and constitutes a substantially straight ridge, although it is rounded at 20, the point of joinder to the side wall 12. Along the minor axis 18, the work surface is curved, see Figure 3, and this curvature transversely is accentuated as the work surface approaches either end of the device. The work surface may be described as generally ovoid, although it is not truly ovoid due to the presence of the straight ridge 16.

It is evident that a user can circulate the massager transversely to its long dimension, but not lengthwise of its long dimension without picking up the cream in the groove hereinafter described. The user will apply the cream into the skin and through circulating action massage the cream into the pores opened by the heat given off by the electric element.

Transversely of the work surface 14 is a groove 22 positioned along the minor axis 18. The valley of the groove is straight and consequently the depth of the groove varies because of the curvature of the work surface. This groove 22 serves to both collect or spread cream depending upon the manipulation of the massager.

Examining now the electric circuit and heating elements, 24 is the base which is an inverted open casing adapted to slip into the casing 10. Centrally thereof is mounted a handle 26 by a screw 28. The handle 26 is made of a material having a low co-efficient of heat transmission. Protruding from one end are a pair of jacks 30 and 32 mounted in insulated relationship on the base 24 and having on their inner ends threads and nuts for mounting conductors. A conductor 34 insulated by porcelain beads 36 taps one end of a heating coil 38 disposed in outwardly directed channels in ceramic block 40. The other end of the coil 38 is connected to a bimetallic element (not shown) in thermostat 42 which has a second electrode 44 connected by conductor 46 to the jack 32. Rock wool insulation 48 resists the flow of heat to the handle 26. A mica sheet 50 is positioned between the ceramic block 40 and the work surface 14.

The thermal element of the thermostat 42 is set to break when the temperature of the work surface drops below 130 degrees or rises above 135 degrees respectively.

Having thus described our invention, what we claim is:

1. A skin massager comprising an ovoid, continuous, substantially rigid, heat applying surface having major and minor axes, a heating element for heating said surface, a rounded ridge along the major axis of said surface, and a groove along the minor axis of said surface.

2. A skin massager comprising a base member having a curved periphery, a side wall positioned at said periphery and normal to and extending from one side of said surface to form an open bottom housing, a heating element mounted in said housing, and a rigid heat applying surface positioned over the open bottom of said housing, said surface having a centrally disposed rounded, substantially straight ridge, and a groove disposed at right angles to the ridge.

3. A skin massager comprising a base member having an oval periphery, a side wall positioned at said periphery and normal to and extending from one side of said surface to form an open bottom housing, a heating element mounted in said housing, and a rigid heat applying surface positioned over the open bottom of said housing, said surface having a centrally disposed rounded, substantially straight ridge and a groove disposed at right angles to the ridge.

4. A skin massager comprising a base member having an ovoid periphery, a side wall positioned at said periphery and normal to and extending from one side of said surface to form an open bottom housing, a heating element mounted in said housing, a rigid heat applying surface having an oval periphery, and a side wall positioned at said periphery and normal to said surface to form a cap that may be fitted over the side wall of said housing, said surface having a centrally disposed, rounded, substantially straight ridge, and means for holding the base and cap in assembled relationship.

5. A skin massager comprising a base member having an ovoid periphery, a side wall positioned at said periphery and normal to and extending from one side of said surface to form an open bottom housing, a heating element mounted in said housing, a rigid heat applying surface having an ovoid periphery, a side wall positioned at said periphery and normal to said surface to form a cap that may be fitted over the side wall of said housing, said surface having a centrally disposed rounded, substantially straight ridge and a groove disposed at right angles to the ridge, and means for holding the base and cap in assembled relationship.

6. A skin massager comprising an ovoid, continuous, substantially rigid heat-applying surface having major and minor axes, a heating element for heating said surface, and a straight ridge along the greater portion of the major axis of said surface, said ridge being transversely rounded whereby the user can rock the massager transversely on the ridge.

GELA JANE BENTON.
WILLIAM A. SCHUMACHER.

REFERENCES CITED

The following references are of record in the file of this patent:

UNITED STATES PATENTS

| Number | Name | Date |
| --- | --- | --- |
| 1,714,693 | Renwick | May 28, 1929 |
| 2,385,501 | Fevas | Sept. 25, 1945 |

FOREIGN PATENTS

| Number | Country | Date |
| --- | --- | --- |
| 19,350 | Great Britain | 1907 |